(12) United States Patent
Lee et al.

(10) Patent No.: US 6,994,534 B2
(45) Date of Patent: Feb. 7, 2006

(54) APPARATUS AND METHOD OF PRODUCING POLYURETHANE RUBBER BANDS

(75) Inventors: Han-Woo Lee, Seoul (KR); Sang-Woo Shim, Kyonggi (KR)

(73) Assignee: Ever Green Friends Co., Ltd., Seoul (KR)

( * ) Notice: Subject to any disclaimer, the term of this patent is extended or adjusted under 35 U.S.C. 154(b) by 250 days.

(21) Appl. No.: 10/428,317

(22) Filed: May 5, 2003

(65) Prior Publication Data

US 2004/0159968 A1 Aug. 19, 2004

(30) Foreign Application Priority Data

Feb. 13, 2003 (KR) .................... 10-2003-0009123
Feb. 13, 2003 (KR) .................... 10-2003-0009125

(51) Int. Cl.
*B29C 47/00* (2006.01)
(52) U.S. Cl. .................... 425/89; 425/92; 425/297; 425/384
(58) Field of Classification Search ............... 425/89, 425/384, 297, 92; 264/288.4, 147, 171.25
See application file for complete search history.

(56) References Cited

U.S. PATENT DOCUMENTS

| | | | | |
|---|---|---|---|---|
| 2,913,773 A | * | 11/1959 | Hassel | 264/126 |
| 3,936,254 A | * | 2/1976 | Sawada et al. | 425/89 |
| 5,686,186 A | * | 11/1997 | Enlow et al. | 428/423.1 |
| 6,235,409 B1 | * | 5/2001 | Serafin et al. | 428/654 |
| 6,296,732 B1 | * | 10/2001 | Enlow et al. | 156/209 |

* cited by examiner

Primary Examiner—Joseph S. Del Sole
(74) Attorney, Agent, or Firm—Egbert Law Offices

(57) ABSTRACT

An apparatus and method of producing polyurethane rubber bands. The apparatus includes a first device for heating and simultaneously drawing a polyurethane sheet produced by incising polyurethane tubular film obtained according to an inflation procedure, a second device for coating a release agent onto both sides of the drawn polyurethane sheet and drying the release agent-coated polyurethane sheet, a third device for longitudinally fine-cutting the dried polyurethane sheet using fine-cutting rollers to form several tens of strips of polyurethane rubber bands, depositing starch or talc powder on both sides of the polyurethane rubber bands, and heat-processing the polyurethane rubber bands deposited by the starch or talc powder, a fourth device for dispersing the heat-processed polyurethane rubber bands to impartially stuff the polyurethane rubber bands into packing receptacles, and a fifth device for heat-aging the packed polyurethane bands in an aging compartment.

1 Claim, 6 Drawing Sheets

[fig 1]
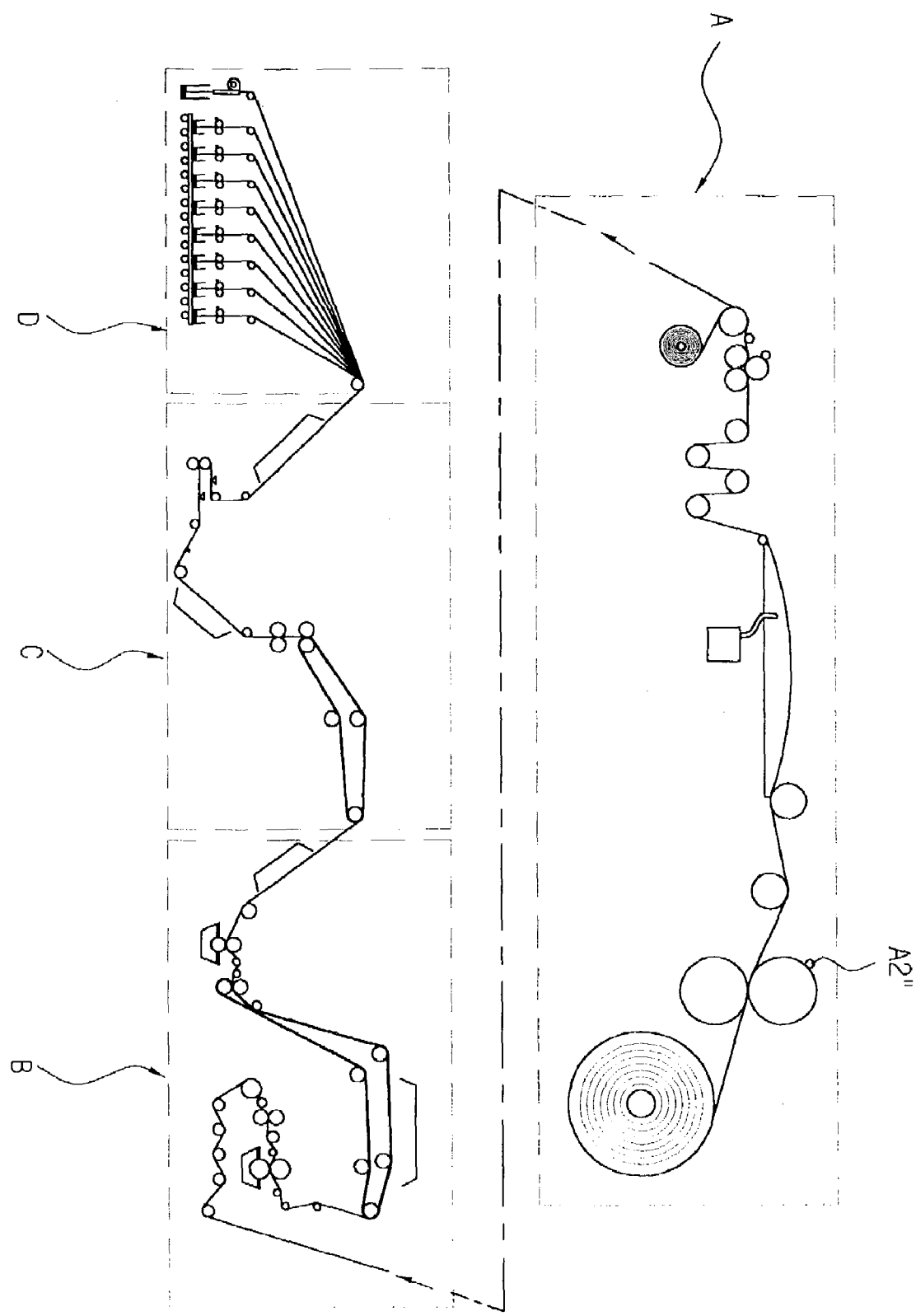

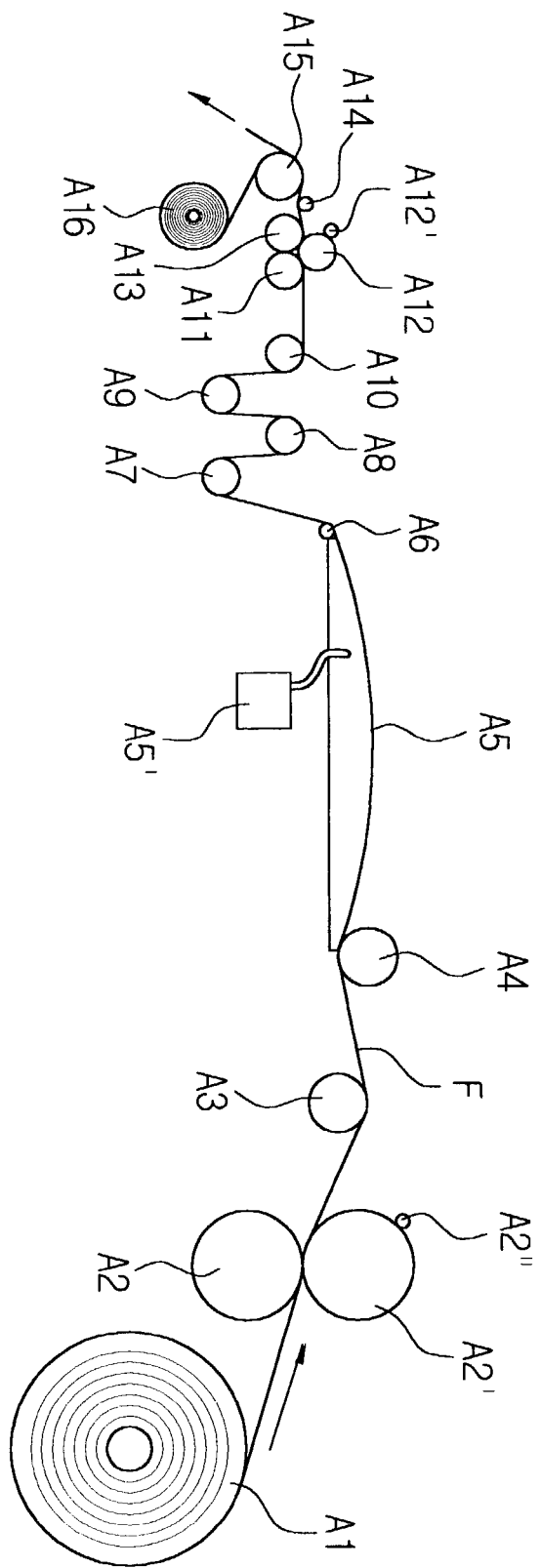
[fig 2]

[fig 3]
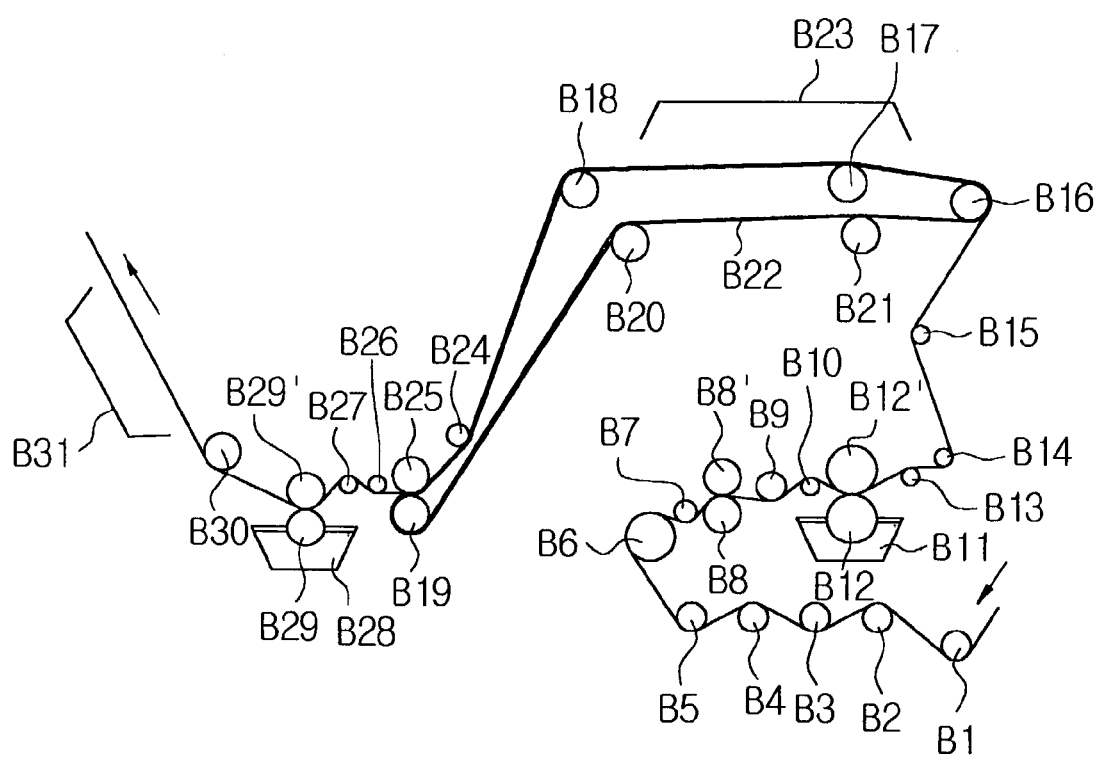

[fig 4]
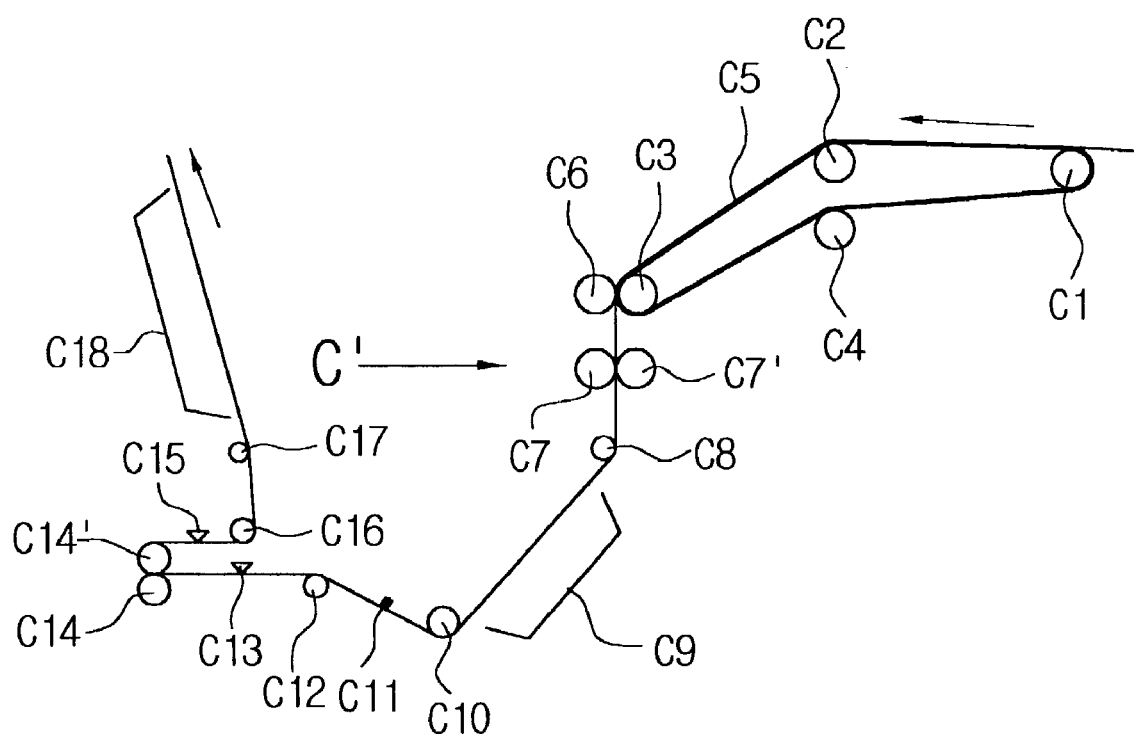

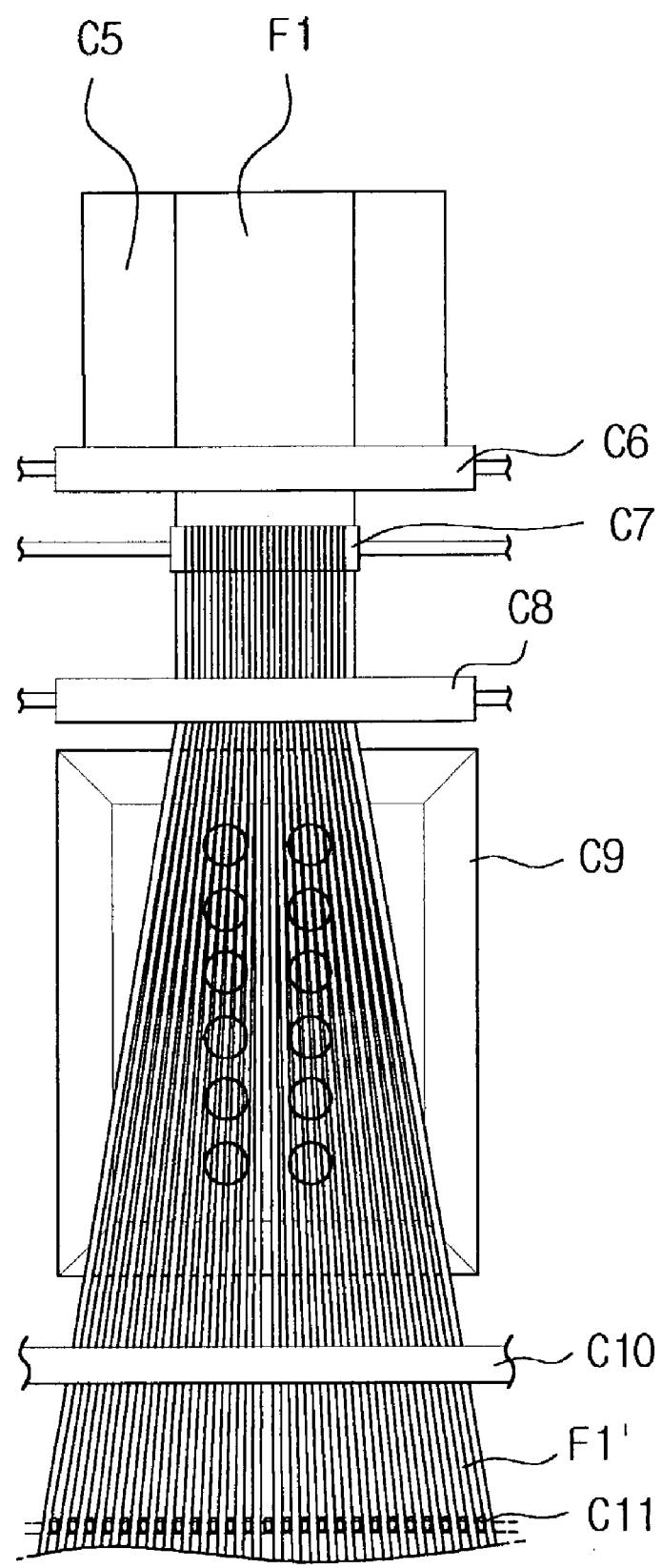
[fig 5]

[fig 6]
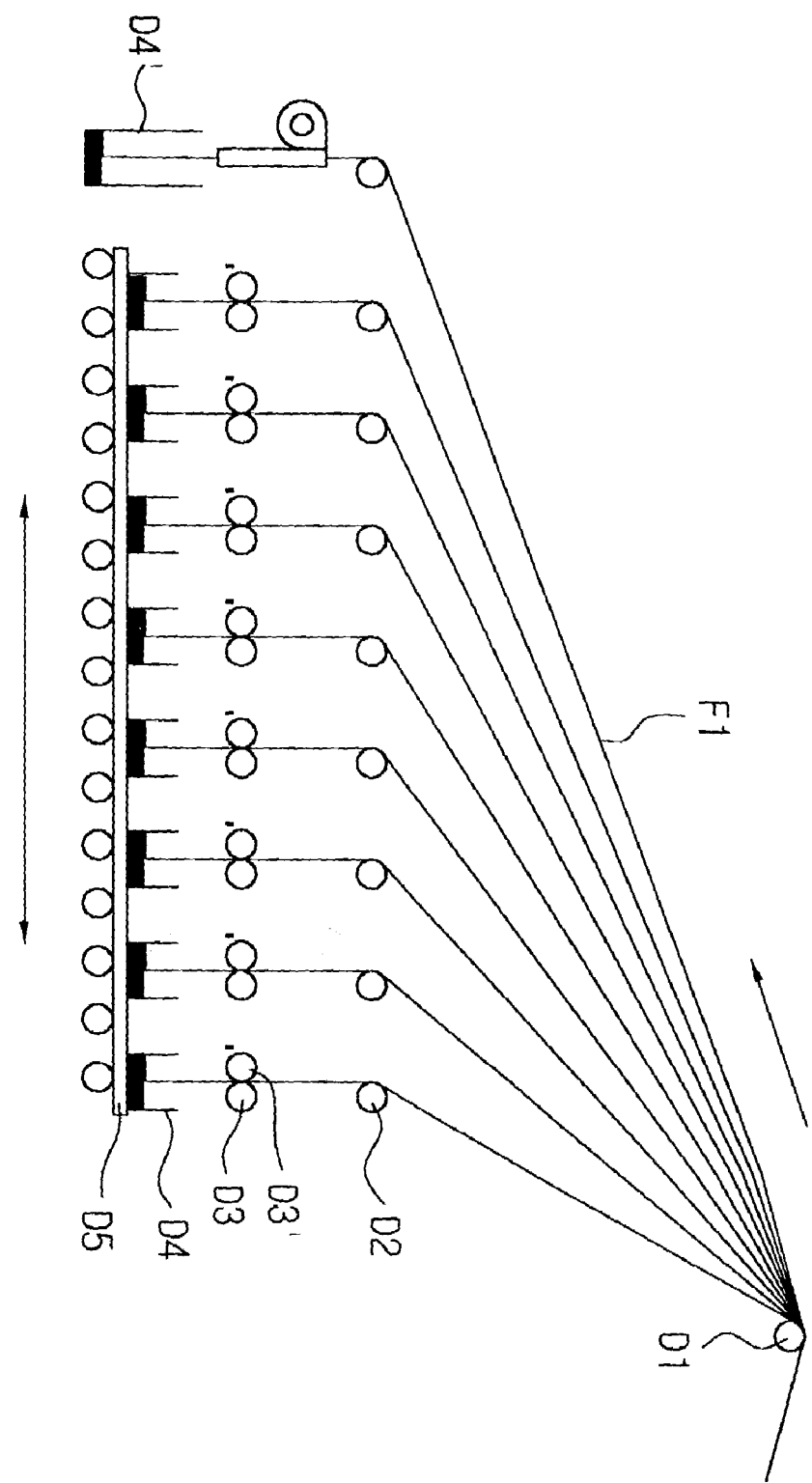

APPARATUS AND METHOD OF PRODUCING POLYURETHANE RUBBER BANDS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention pertains, in general, to an apparatus for producing polyurethane rubber bands using a polyurethane sheet obtained from a thermoplastic polyurethane resin according to an inflation procedure, and a method of producing the polyurethane rubber bands using the same. More particularly, the present invention relates to an apparatus for producing polyurethane rubber bands, including a first device for heating and simultaneously drawing a polyurethane sheet and separating a PE film acting as a supporting film from the polyurethane sheet; a second device for coating a release agent onto both sides of the drawn polyurethane sheet without the PE film and drying the release agent-coated polyurethane sheet; a third device for longitudinally fine-cutting the dried polyurethane sheet using fine-cutting rollers to form several tens of strips of polyurethane bands, depositing starch or talc powder onto both sides of the polyurethane bands, and heat-processing the polyurethane bands deposited by the starch or talc powder; a fourth device for dispersing the heat-processed polyurethane bands to impartially stuff the polyurethane bands into packing receptacles; and a fifth device for heat-aging and stabilizing the packed polyurethane bands in an aging compartment, and a method of producing the polyurethane rubber bands using the same.

BACKGROUND OF THE INVENTION

As well known to those skilled in the art, various conventional apparatuses and methods have been utilized to produce polyurethane rubber bands. One example is a conventional apparatus provided with an extruder for extruding a thermoplastic polyurethane resin into a plurality of bands and an aging compartment for heat-aging and stabilizing the bands, and a method using such apparatus. Another conventional apparatus for producing the polyurethane rubber bands includes a first device for forming a film sheet from a thermoplastic polyurethane resin according to an inflation procedure, a second device for directly fine-cutting the film sheet to form polyurethane rubber bands, and a third device for drawing and heat-aging the polyurethane rubber bands in a heat-aging compartment. The former is frequently used in Japan, and the latter is in USA. Meanwhile, Korea imports 100% of the needed polyurethane rubber bands from Japan and the USA.

However, the polyurethane rubber bands produced by the above conventional apparatuses are disadvantageous in that the polyurethane rubber bands are sticky, so they are very apt to be attached to each other and workability is reduced when they are applied to clothes. Particularly, the polyurethane rubber bands made in Japan are poor in terms of tensile strength, restoring force, and heat resistance, thus they are readily lengthened and easily broken.

BRIEF SUMMARY OF THE INVENTION

Therefore, the present invention has been made keeping in mind the above disadvantages occurring in the prior arts, and an object of the present invention is to provide an apparatus for producing polyurethane rubber bands, which draws a polyurethane sheet at a high temperature to improve its tensile strength and heat resistance, coats a release agent onto the drawn polyurethane sheet, dries the release agent-coated polyurethane sheet to firstly remove the stickiness of polyurethane rubber bands, deposits talc or starch powder onto the polyurethane rubber bands, and heat-processes the resulting polyurethane rubber bands so as to completely remove their stickiness and improve their restoring force, thereby imbuing the polyurethane rubber bands with excellent physical properties, and a method of producing the polyurethane rubber bands using the same.

BRIEF DESCRIPTION OF THE SEVERAL VIEWS OF THE DRAWINGS

The above and other objects, features and other advantages of the present invention will be more clearly understood from the following detailed description taken in conjunction with the accompanying drawings.

FIG. 1 schematically illustrates an apparatus for producing polyurethane rubber bands according to the present invention.

FIG. 2 schematically illustrates a first device for heating and drawing a polyurethane sheet and separating a supporting film from the pol~urethane sheet.

FIG. 3 schematically illustrates a second device for coating a release agent on the drawn polyurethane sheet and drying the release agent-coated polyurethane sheet.

FIG. 4 schematically illustrates a third device for fine-cutting the dried polyurethane sheet to form several tens of strips of polyurethane bands, depositing starch powder on the polyurethane bands, and heat-processing the polyurethane bands deposited by the starch powder.

FIG. 5 is a front view of FIG. 4.

FIG. 6 schematically illustrates a fourth device for dispersing and packing the heat-processed polyurethane bands.

DETAILED DESCRIPTION OF THE INVENTION

Reference now should be made to the drawings, in which the same reference numerals are used throughout the different drawings to designate the same or similar components.

According to the present invention, an apparatus for producing polyurethane rubber bands comprises the following five devices, that is, first to fifth devices.

The first device is structured such that a layered film (F) is fed from a polyurethane sheet feeding roller (A1) using first fetching rollers (A2, A2') provided with a first rotation speedometer (A2"), drawn by first pulling rollers (A11 to A13) provided with a second rotation speedometer (A12') via guide rollers (A3, A4, and A6 to A10) while coming into contact with a hot plate (A5) including a heating medium supplied from a heating source, separated into each film layer by a separation roller (A15) through a guide roller (A14), and a polyethylene film (F2) separated from the polyurethane sheet is wound on a winding roller (A16) while the polyurethane sheet without the polyethylene film is transported to the second device, as shown in FIG. 2

The second device is structured such that the polyurethane sheet (F1) transported from the first device is fetched by second fetching rollers (B8, B8') coming into contact with each other via a plurality of guide rollers (B1 to B7, B9, B10), passed between a first coating roller (B12) dipped in a release agent in a first release agent tub (B11) and a first contact roller (B 12') coming into contact with the first coating roller (B12) so as to be coated with the release agent at a first side thereof, moved by a first conveyer belt (B22) operating by first conveyer rollers (B16 to B21) via a plurality of guide rollers (B13 to B15) while passing through a first drying compartment (B23) and first pressing rollers (B24, B25), guided by guide rollers (B26, B27), passed between a second coating roller (B29) dipped in a release agent in a second release agent tub (B28) and a second contact roller (B29') coming into contact with the second coating roller so as to be coated with the release agent at a second side thereof, and transported through a guide roller (B30) and a second drying compartment (B31) to the third device, as shown in FIG. 3.

The third device is structured such that the polyurethane sheet (F1) transported from the second device is moved by a second conveyer belt (C5) operating by second conveyer rollers (C1 to C4), guided by a second pressing roller (C6) coming into contact with a conveyer guide roller (C3), and fine-cut using fine-cutting rollers (C7, C7') engaged with each other to form several tens of strips of polyurethane rubber bands (elastomers)(F1'), and the polyurethane rubber bands (F1') coming into contact with each other are moved through guide rollers (C8, C10) and a first heating compartment (C9), separated from each other by a separation unit (C11), guided by a guide roller (C12), deposited with starch powder using a mobile first starch feeding unit (C13) at first sides thereof, passed through second pulling rollers (C14, C14') and a second starch feeding unit (C15) so as to deposit the starch powder upon second sides thereof, and transported through guide rollers (C16, C17) and a second heating compartment (C18) to the fourth device, as shown in FIG. 4.

The fourth device is structured such that the heat-processed polyurethane rubber bands (F1') are stuffed through engagement rollers (D3, D3'), while the rubber bands (F1') are guided by a dispersing roller (D1) and guide rollers (D2), into packing receptacles (N) positioned at regular intervals on a receptacles supporting plate (D5) reciprocating within a predetermined distance, as shown in FIG. 6.

The fifth device is structured such that the polyurethane bands (F1') filled in the packing receptacles (D4) are heat-aged and stabilized in an aging compartment at about 60° C. for 48 hours.

Meanwhile, reference character D4' denotes a scrap-band receptacle for receiving rubber scrap-bands generated during production of the polyurethane sheet (F1), and the aging compartment (not shown) consists of adiabatic walls and steam- or electric heating-wires for maintaining the inside of the aging compartment at a temperature of about 60° C.

The polyurethane sheet used in the present invention is produced according to an inflation procedure; that is, a concentrically double-extruding procedure, in such a way that the polyurethane sheet forms a tube consisting of a PE (polyethylene) film on an inner surface thereof and a polyurethane film on an outer surface thereof. The tube is incised in such a way that an incised piece of the tube forms a long sheet with a width of about 30 cm. The PE film acting as a supporting film is removed from the polyurethane sheet using the separation roller (A15).

There will be given a detailed description of the first to third devices, below.

As for the first device, a draw ratio is determined by the difference between a speed of fetching the polyurethane sheet (F1) using the fetching rollers (A2, A2') and a speed of pulling the polyurethane sheet using the pulling rollers (A11, A12, A13). At this time, the speed of pulling the polyurethane sheet should be always greater than the speed of fetching the polyurethane sheet so as to maintain the polyurethane sheet in a stretched state, and rotation speedometers (A2', A2") are installed on the pulling and fetching rollers to measure the speeds of the pulling and fetching rollers. Additionally, oil with a temperature of 150° C. or higher, acting as the heating medium, supplied from the heating source (A5') is filled into the hot plate to maintain the hot plate at a temperature of 110 to 130° C.

The second device comprises the coating rollers (B12, B29) for coating the release agent on both sides of the polyurethane sheet (F1), the drying compartments (B23, B31) for drying the release agent-coated polyurethane sheet, and the first conveyer belt (B22). At this time, the polyurethane sheet drawn by the first device is moved by the first conveyer belt (B22) to prevent the polyurethane sheet from being rolled or wrinkled.

The third device includes the second conveyer belt for preventing the polyurethane sheet (F1) from being rolled or wrinkled, the fine-cutting rollers, acting as a fine-cutting unit, for fine-cutting the polyurethane sheet (F1) to form the polyurethane rubber bands, and a starch feeding unit for removing stickiness of the polyurethane rubber bands.

Now, there will be described a method of producing the polyurethane rubber bands using the above apparatuses according to the present invention.

The polyurethane sheet obtained from a tubular film produced by the inflation procedure is better than that obtained by a conventional extrusion process in terms of physical properties, so the polyurethane sheet obtained by the inflation procedure is used in the present invention.

The method of producing the polyurethane rubber bands using the first to fifth devices comprises five steps, that is, the following first to fifth steps.

In the first step, the polyurethane sheet is drawn by the fetching rollers (A2, A2') and pulling rollers (A11, A12, A13) while coming into contact with the hot plate (A5) with a temperature of 110 to 130° C. At this time, the draw ratio of the polyurethane sheet is preferably 40 to 70% so that a width and a thickness of the polyurethane sheet are 30 cm and 85 µm before it is drawn, and 21 to 24 cm and 70 to 75 µm after it is drawn, respectively.

For example, when the draw ratio is lower than 40%, tensile strength and restoring force of the polyurethane sheet are poor. On the other hand, when the draw ratio is higher than 70%, elongation of the polyurethane sheet is poor even though the tensile strength and restoring force of the polyurethane sheet are improved, so it is not used in application fields requiring excellent elongation and has disadvantages of undesirable rolling of the polyurethane sheet and increased defective proportion during production of the polyurethane rubber bands.

The draw ratio is controlled by the rotation speedometers (A2", A12'), and the PE film on the inner surface of the polyurethane tubular film obtained according to the inflation procedure; that is, the concentrically double-extruding procedure, is separated from the polyurethane film and wound by the winding roller (A16).

As for the second step, the release agent is coated on the polyurethane sheet in a thickness of 5 to 7 μm to remove stickiness of the polyurethane sheet, insides of the drying compartments are about 60° C. in temperature, and the conveyer belts are used to prevent the polyurethane sheet from being rolled or wrinkled.

In the third step, the polyurethane sheet is fine-cut by several tens of blades, circumferentially formed at regular intervals around the fine-cutting roller (C9) to form polyurethane rubber bands with a width of about 8 mm, and starch powder, such as corn or potato flour, is deposited on the cut polyurethane rubber bands to remove stickiness of the polyurethane rubber bands. At this time, insides of the heating compartments are about 60° C. in temperature.

In the fourth step, the starch powder-deposited polyurethane rubber bands are dispersed using a dispersing roller to pack the dispersed polyurethane rubber bands into packing receptacles.

The polyurethane rubber bands passing through the fourth step are heat-aged in the aging compartment at about 60° C. for 48 hours in the fifth step, thereby accomplishing the target polyurethane rubber bands.

As described above, the present invention provides an apparatus for producing a polyurethane rubber band, which improves tensile strength and heat resistance of the polyurethane rubber band, freely controls a draw ratio within a range that physical properties of the polyurethane rubber band are preferably maintained, removes most of the stickiness from the polyurethane sheet and the rubber band to improve their workability, and heat-processes the polyurethane rubber band for a long period of time to improve its restoring force.

Furthermore, the present invention provides a method of producing the polyurethane rubber band, in which the polyurethane sheet produced according to an inflation procedure is used as a raw material of the polyurethane rubber band so as to obtain excellent tensile strength of the polyurethane rubber band, optimum extension and elongation are secured to allow physical properties of the polyurethane rubber band to be excellent, the polyurethane rubber band has desirable releasing property because stickiness of the polyurethane rubber band considered as one of the main disadvantages of the polyurethane rubber band is mostly removed by coating a release agent on the polyurethane rubber band and depositing starch powder on it, and the polyurethane sheet is heat-processed for a long period of time to produce the polyurethane rubber band, thereby accomplishing the desired polyurethane rubber band with excellent restoring force.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced other than as specifically described.

We claim:

1. An apparatus for producing polyurethane rubber bands comprising:
    a first device structured such that a polyurethane sheet is fed from a polyurethane sheet feeding roller while coming into contact with a hot plate by first fetching rollers coming into contact with each other, pulled by first pulling rollers via a plurality of first guide rollers, and heat-drawn between the fetching rollers and the pulling rollers, and a polyethylene film is separated from the drawn polyurethane sheet by a separation roller and wound by a winding roller while the polyurethane sheet without the polyethylene film is transported to a second device;

the second device is structured such that the polyurethane sheet transported from the first device is fetched by second fetching rollers coming into contact with each other via a plurality of second guide rollers, the polyurethane sheet passes between a first coating roller dipped into a release agent in a first release agent tub and a first contact roller coming into contact with the first coating roller so as to coat the polyurethane sheet with the release agent at a first side thereof, the coated polyurethane sheet is moved by a first conveyer belt operating by first conveyer rollers via a plurality of third guide rollers while passing through a first drying compartment and first pressing rollers, the coated polyurethane sheet is guided by fourth guide rollers and passed between a second coating roller dipped in a release agent in a second release agent tub and a second contact roller coming into contact with the second coating roller so as to be coated with the release agent at a second side thereof, the polyurethane sheet is then transported through fifth guide rollers and a second drying compartment to a third device;

the third device is structured such that the polyurethane sheet transported from the second device and is moved by a second conveyer belt operating by second conveyer rollers, the polyurethane sheet is then guided by a second pressing roller coming into contact with a conveyer guide roller and fine-cut using fine-cutting rollers engaged with each other to form several tens of strips of polyurethane rubber bands, the polyurethane rubber bands contact each other and are moved through sixth guide rollers and a first heating compartment, the polyurethane rubber bands being separated from each other by a separation unit and deposited with starch powder using a mobile first starch feeding unit at first sides thereof, the separated polyurethane rubber bands are passed through second pulling rollers and a second starch feeding unit so as to deposit the starch powder onto second sides thereof and transported through seventh guide rollers and a second heating compartment to a fourth device;

the fourth device is structured such that the polyurethane rubber bands transported from the third device are guided by a dispersing roller and eighth guide rollers, the polyurethane rubber bands are stuffed through engagement rollers into packing receptacles positioned at regular intervals on a reciprocating receptacle supporting plate, the polyurethane rubber bands are then transported to a fifth device; and the fifth device is structured such that the polyurethane rubber bands transported from the fourth device are heat-aged and stabilized while being filled into the packing receptacles in an aging compartment.

* * * * *